(12) United States Patent
Ueno (10) Patent No.: US 7,359,342 B2
(45) Date of Patent: Apr. 15, 2008

(54) CDMA RECEIVER, AND PATH MANAGEMENT METHOD AND PATH MANAGEMENT PROGRAM THEREOF

(75) Inventor: Masayoshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 819 days.

(21) Appl. No.: 10/807,203

(22) Filed: Mar. 24, 2004

(65) Prior Publication Data

US 2004/0190543 A1    Sep. 30, 2004

(30) Foreign Application Priority Data

Mar. 26, 2003    (JP)    ............... 2003-086379

(51) Int. Cl.
*H04B 7/00*    (2006.01)
(52) U.S. Cl. ...................... 370/310; 370/342
(58) Field of Classification Search ............... 370/335, 370/342, 379, 441, 310; 375/136, 142, 143, 375/144, 147, 150, 152, 349, 267, 347, 350
See application file for complete search history.

(56) References Cited

U.S. PATENT DOCUMENTS

2001/0028677 A1    10/2001    Wang et al.
2003/0026233 A1 *   2/2003    Ohsuge ...................... 370/342

FOREIGN PATENT DOCUMENTS

| JP | HEI9-181704 | 7/1997 |
| JP | 2002-141835 | 5/2002 |
| JP | 2003-23671 | 1/2003 |
| JP | 2003-158504 | 5/2003 |

OTHER PUBLICATIONS

Wang et al., "Generalized Rake Reception for Cancelling Interference From Multiple Base Stations", VTC 2000-Fall, IEEE VTS 52nd, Vehicular Technology Conference, New York, NY, U.S.A., vol. 5 of 6, pp. 2333-2339, Conference 52.

(Continued)

*Primary Examiner*—Seema S. Rao
*Assistant Examiner*—Wanda Z Russell
(74) *Attorney, Agent, or Firm*—Dickstein Shapiro LLP (57) ABSTRACT

A CDMA receiver capable of reducing path search processing time. A CDMA receiver comprises a path search section for specifying finger allocation according to delay profiles of respective branch signals received from base stations, a plurality of fingers which are allocated to the branch signals based on the finger allocation specified by the path search section, and a rake receiving section for maximal-ratio-combining the power of a plurality of signals obtained from the fingers, which have been distributed due to their respective delays. The path search section includes a path management section to search for paths in response to the branch signals, and stores detected path information in a detected path table storing area in a memory. The number of paths which the path management section searches for is changed according to the number of received branch signals. Thereby, the processing time for a path search on the occasion when the number of branches has increased can be shortened. Consequently, the CDMA receiver consumes lower amounts of power.

6 Claims, 5 Drawing Sheets

OTHER PUBLICATIONS

Mitsugi et al., Path-search algorithm introducing path-management tables for DS-CDMA mobile terminal, 13th IEEE International Symposium on Personal Indoor and Mobile Radio Communications. PIMRC 2002, Proceedings (Cat No. 02TH8637), Proceedings of the 13th IEEE International Symposium on Personal Indoor and Mobile Radio Communications (PIMRC 20020, PAVILH, Piscataway, NJ, U.S.A., vol. 2, pp. 730-734 (2002).

Japanese Office Action dated Jan. 18, 2005 (and English translation of relevant portion).

* cited by examiner

FIG. 3

BRANCH 1

| PATH NO. | SYNCHRONOUS STATE | PATH DELAY TIME | CORRELATION LEVEL | ALLOCATED FINGER NO. |
|---|---|---|---|---|
| #0 | SYNCHRONOUS | 128 | 1034 | #1 |
| #1 | SYNCHRONOUS | 136 | 789 | INVALID |
| #2 | ASYNCHRONOUS | INVALID | INVALID | INVALID |
| #3 | SYNCHRONOUS | 106 | 567 | #3 |
| ... | | | | |

BRANCH 2

| PATH NO. | SYNCHRONOUS STATE | PATH DELAY TIME | CORRELATION LEVEL | ALLOCATED FINGER NO. |
|---|---|---|---|---|
| #0 | SYNCHRONOUS | 124 | 1034 | #2 |
| #1 | ASYNCHRONOUS | INVALID | INVALID | INVALID |
| #2 | SYNCHRONOUS | 143 | 789 | #0 |
| #3 | ASYNCHRONOUS | INVALID | INVALID | INVALID |

BRANCH 3

...

F I G. 4

| N_BH | N_Path | ACCEPTABLE NUMBER OF PATHS |
|---|---|---|
| 1 | 12 | 12 |
| 2 | 8 | 16 |
| 3 | 7 | 21 |
| 4 | 6 | 24 |
| 5 | 6 | 30 |
| 6 | 6 | 36 |
| 7 | 6 | 42 |
| 8 | 5 | 40 |

ND PATH
CDMA RECEIVER, AND PATH MANAGEMENT METHOD AND PATH MANAGEMENT PROGRAM THEREOF

FIELD OF THE INVENTION

The present invention relates to a CDMA receiver, and more particularly, to a CDMA receiver, and a path management method and a path management program for the same at the time of diversity handover.

BACKGROUND OF THE INVENTION

In mobile communications, multiple waves (multi-path) with different propagation delay time interfere one another due to variations in the lengths of transmission paths for respective receive waves of multiple wave propagation.

A CDMA (Code Division Multiple Access) receiver spreads information data over bands using a high-rate spread code with a cycle shorter than propagation time, and therefore, multiple waves which differ from each other in propagation delay time can be separated/extracted. Such CDMA receiver selects valid or available paths based on power delay profiles generated by despreading received signals while delaying the timing to carry out in-phase synthesis (rake synthesis), thereby achieving the diversity effect and improving receiving characteristics.

Besides, on the occasion of diversity handover (hereinafter referred to as DHO), the CDMA receiver receives signals (hereinafter referred to as branch) from a plurality of base stations, and selects available paths based on a delay profile of each received branch. The selected paths are subjected to rake synthesis.

There is found a technique concerning a multipath search method in Japanese Patent Application laid open No. HEI9-181704. On the other hand, Japanese Patent Application laid open No. 2002-141835 discloses a technique concerning a finger allocation method when there are plural branches.

The aforementioned conventional CDMA receiver, however, has to conduct a path search and store path information with respect to each branch at the time of DHO. Consequently, processing time is prolonged, and also more memory area is required to store the path information.

SUMMARY OF THE INVENTION

It is therefore an object of the present invention, in order to overcome the above-described problems, to provide a CDMA receiver, and a path management method and a path management program thereof for controlling the number of paths according to the number of received branch signals on the occasion of diversity handover to thereby shorten path search processing time and reduce memory capacity.

In accordance with the first aspect of the present invention, to achieve the above objects, there is provided a CDMA receiver, comprising: a path search section for receiving signals from a plurality of base stations, and specifying finger allocation according to delay profiles of respective branch signals received from the plural base stations; a plurality of fingers which are allocated to the branch signals based on the finger allocation specified by the path search section; and a rake receiving section for synthesizing (maximal-ratio-combining) the power of a plurality of signals obtained from the fingers, which have been distributed due to their respective delays; wherein the path search section includes a path management section to search for paths in response to the branch signals, and stores information on detected paths (detected path information) in a detected path table storing area in a memory; and wherein the number of paths which the path management section searches for is changed according to the number of received branch signals.

Preferably, in the detected path table storing area, memory area and the address of memory area for storing detected path information with respect to each branch signal are changed according to the number of branch signals.

In addition, the number of paths which the path management section searches for with respect to each branch signal may be found out by adding the number of candidate paths for path switching to a value obtained by dividing the number of the fingers by the number of the received branch signals.

In accordance with the second aspect of the present invention, there is provided a path management method with the use of the above-described CDMA receiver, wherein the operation of the path search section involves: a path management step for searching for paths in response to the branch signals; a path information storing step for storing detected path information in a detected path table storing area; and a maximum path number finding step for finding the number of paths to be searched at the path management step according to the number of received branch signals and the detected path information.

In accordance with the third aspect of the present invention, there is provided a path management program for the above-described CDMA receiver, wherein the path search section implements: a path management process for searching for paths in response to the branch signals; a path information storing process for storing detected path information in a detected path table storing area; and a maximum path number finding process for finding the number of paths to be searched by the path management process according to the number of received branch signals and the detected path information.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, a description of preferred embodiments of the present invention will be given in detail.

Figure 1:
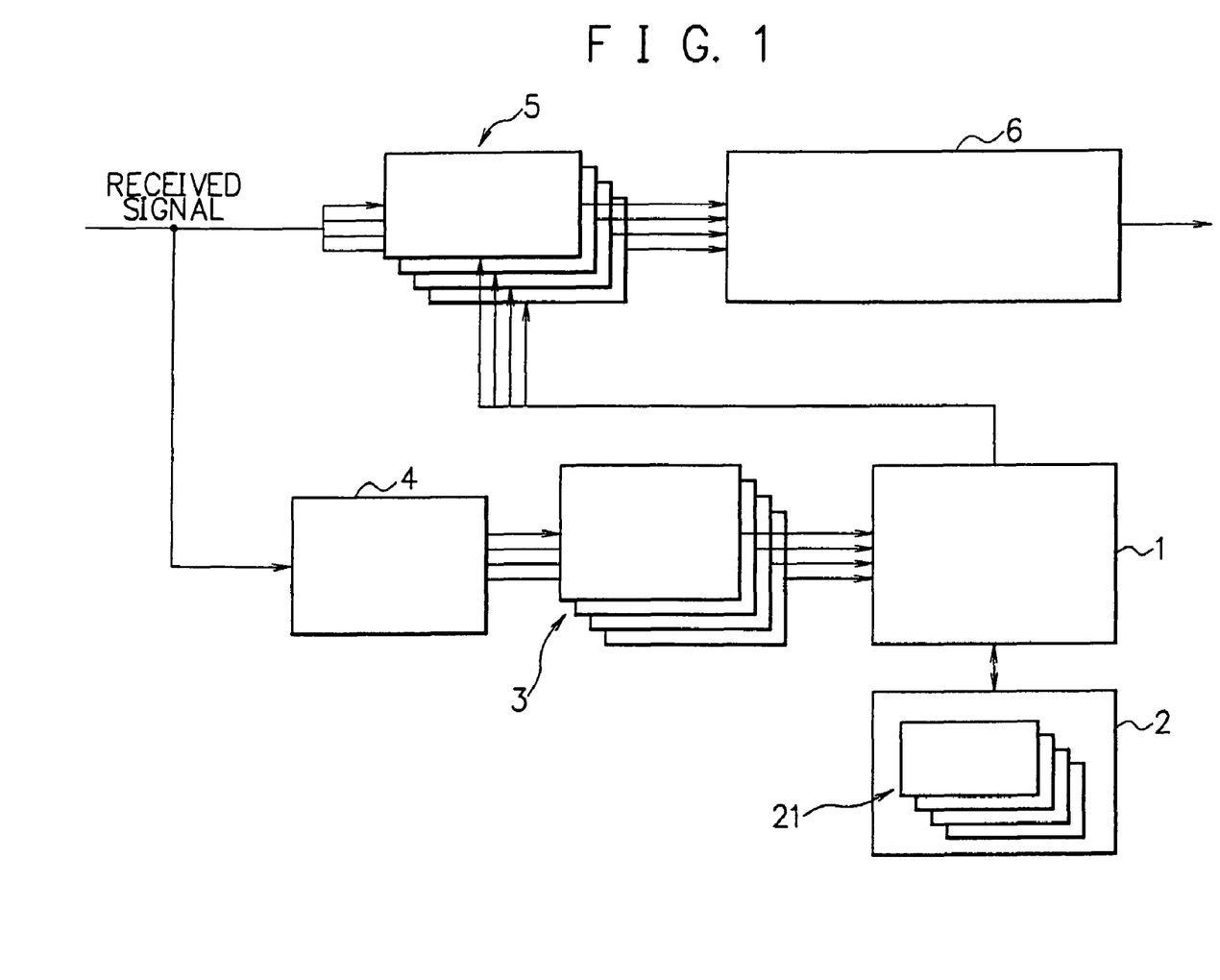
FIG. 1 is a block diagram showing the configuration of a CDMA receiver according an embodiment of the present invention.

FIG. 1 is a block diagram showing the configuration of a CDMA receiver according to the first embodiment of the present invention. Referring to FIG. 1, the CDMA receiver of this embodiment comprises a path search section 1 for searching for path information, a memory 2 for storing information, delay profiles 3 generated for respective branches, a matched filter 4 for generating the delay profile 3 based on a received signal, a finger section 5 composed of a plurality of units, and a rake receiving section 6 for synthesizing outputs from the finger section 5. The memory 2 includes a detected path table storing area 21 for retaining the path information detected by the path search section 1.

The matched filter 4 creates the delay profile with respect to each branch (each base station) based on a received signal using a spread code for the branch. The path search section 1 searches through the delay profiles 3, and selects one or more paths from among valid or available paths to allocate the path(s) for the finger section 5. In the finger section 5, each of the finger units carries out despreading and channel estimation for the received signal on the basis of information as to the path (path information, such as path delay time, branch number, etc.) allocated by the path search section 1. The rake receiving section 6 synthesizes data output from the finger section 5, and outputs the synthesized data to the subsequent stage as receive data symbol information.

In the following, a description will be made in detail of the configuration of the path search section 1 with reference to FIG. 2.

Figure 2:
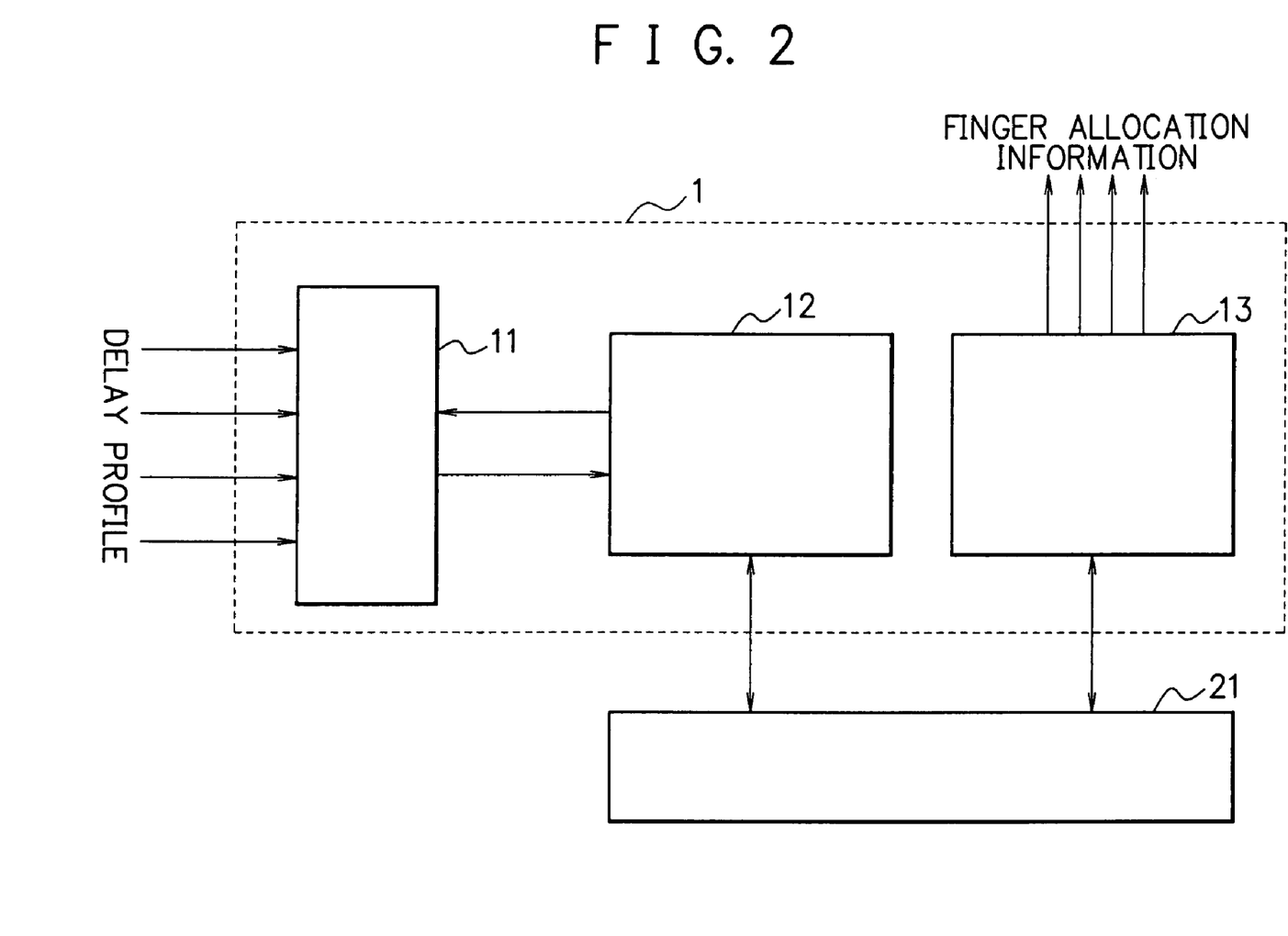
FIG. 2 is a block diagram showing the configuration of a path search section depicted in FIG. 1.

FIG. 2 is a block diagram showing the configuration of the path search section 1. As can be seen in FIG. 2, the path search section 1 includes a delay profile selector 11 for selecting a delay profile signal, a path management section 12 for searching information as to valid or available paths based on the delay profile signal to retain the information in the detected path table storing area 21 in the memory 2, and a finger allocation controller 13 for determining finger allocation based on detected path tables stored in the detected path table storing area 21.

A program for implementing the operations, which will be described later, is stored in the respective sections (the finger section 5, rake receiving section 6 and path search section 1) shown in FIGS. 1 and 2.

Figure 3:
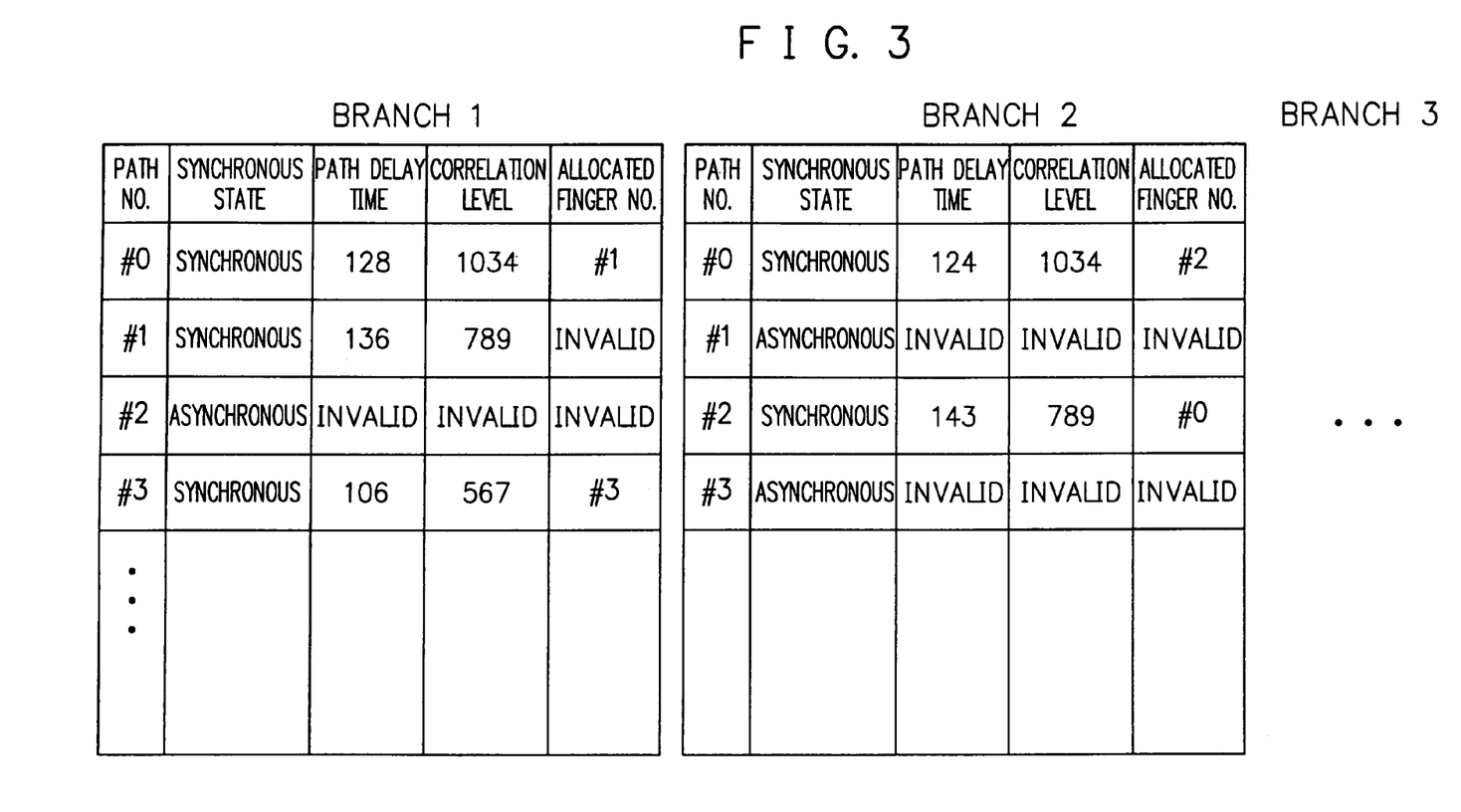
FIG. 3 is a diagram showing the configuration of a detected path table storing area depicted in FIG. 1.

Hereinafter, a description will be given in detail of the configuration of a table stored in the detected path table storing area 21 with reference to FIG. 3.

A path table is prepared for every branch. An area for a certain number of paths (N_paths) is reserved in the respective path tables. The path table is provided with a branch number, and contains various types of information necessary for the path management section 12 and the finger allocation controller 13, such as path synchronous state, path delay time, correlation level or value, allocated finger number and the like, with respect to each path.

Through the path management method applied to the CDMA receiver of the present invention, at the time of diversity handover (DHO), the number of paths is controlled according to the number of received branches. As shown in FIG. 2, the detected path table for each branch is constructed based on the delay profile of the branch, and stored in the detected path table storing area 21. On this occasion, by adjusting the number of paths to be searched for or to be detected (hereinafter referred to as search paths) on the basis of an increase/decrease in the number of received branches, the time taken to complete path search processing (processing to search delay profiles for the same signals each having different delay time, which will hereinafter be referred to as path search processing) can be shortened. In addition, the memory capacity of the detected path table storing area 21 and memory usage can be reduced. Consequently, the CDMA receiver consumes lower amounts of power due to the reductions in path search processing time, memory capacity and memory usage.

In the following, the operation of the CDMA receiver of this embodiment will be described. First, a description will be given of the operation when there is one branch.

The path management section 12 searches delay profiles 3 for one or more peak points or values of the respective profiles, and detects their positions (path delay time) and correlation levels (correlation values). Besides, the path management section 12 carries out path search processing for the obtained peak value (path). More specifically, the path management section 12 performs a validity check for judging the validity of the detected path based on the correlation level of the path, peak mask processing for deleting the vicinity of the detected peak from the delay profiles so that the same path is not to be allocated for a plurality of fingers, and path protection processing for desynchronizing the path when no path has been detected as many times as the number of protection times in succession so as to prevent a change in paths or path switching resulting from a temporary drop in the correlation level due to fading. The path management section 12 carries out the path search processing a number of times corresponding to the number of paths, and detected information on the respective paths is stored in the detected path table storing area 21, which is reserved in the memory 2. The finger allocation controller 13 selects available paths based on the path information retained in the detected path table storing area 21, and allocates the paths to respective fingers. One approach to the allocation of paths is to allocate the available paths in the descending order of correlation level to the fingers. When the number of available paths is not sufficient for the fingers, the fingers to which no path has been allocated are not subjected to rake synthesis. On the other hand, when there are available paths more than the fingers, the paths which have not been allocated for the fingers becomes candidate paths for allocation.

Next, the operation of the CDMA receiver when the number of branches, N_BH, is N (N: an integer larger than 1) by the DHO will be described. The path management section 12 carries out the aforementioned path search processing in a sequential order with respect to each branch. The path management section 12 selects the delay profiles subjected to the peak detection for the branches on the basis of path search object branch numbers through the delay profile selector 11. Detected paths are stored in the detected path table provided to each branch as shown in FIG. 3. The finger allocation controller 13 selects one or more paths to be allocated to finger(s) from the path table of each branch, and allocates the paths to the respective fingers.

On this occasion, if the number of search paths N is a fixed value (a predetermined value), the time required for the path search processing is simply prolonged in proportion to the number of branches, N_BH. Therefore, in accordance with the present invention, an increase in the path search processing time can be prevented by dynamically controlling the number of search paths (N_Path) depending on the number of branches (N_BH), that is, by setting the acceptable number of paths, which is the product of the number of branches and the number of search paths, to substantially a steady value. Even when the number of search paths increases to N_BH times due to an increase in the number of branches (N_BH), the number of fingers to which paths can be allocated is fixed, and only the candidate paths for allocation increases. Thus, the path search processing time can be shortened without deteriorating path search characteristics (an increase in the path search processing time, bugs resulting from an increase in memory capacity, etc.) by reducing N_Path according to an increase/decrease in N_BH.

For example, N_Path can be determined in the following manner. In the case where N_BH=1, since an area of the paths corresponding to the number of fingers (N_Finger) and candidate paths for path switching (4, in this example) will suffice, N_Path=N_Finger+4. Besides, in the case where N_BH=2, if it is assumed that fingers of the same number are allocated to respective branches, then sufficient N_Path is expressed as follows:

$$N\_Path=(N\_Finger/2)+4.$$

When N_BH=3, 4, . . . , in likewise manner, N_Path can be obtained by the following formula:

$$N\_Path=(N\_Finger/N\_BH)+4 \text{ (fractional figures are truncated).}$$

Figure 4:
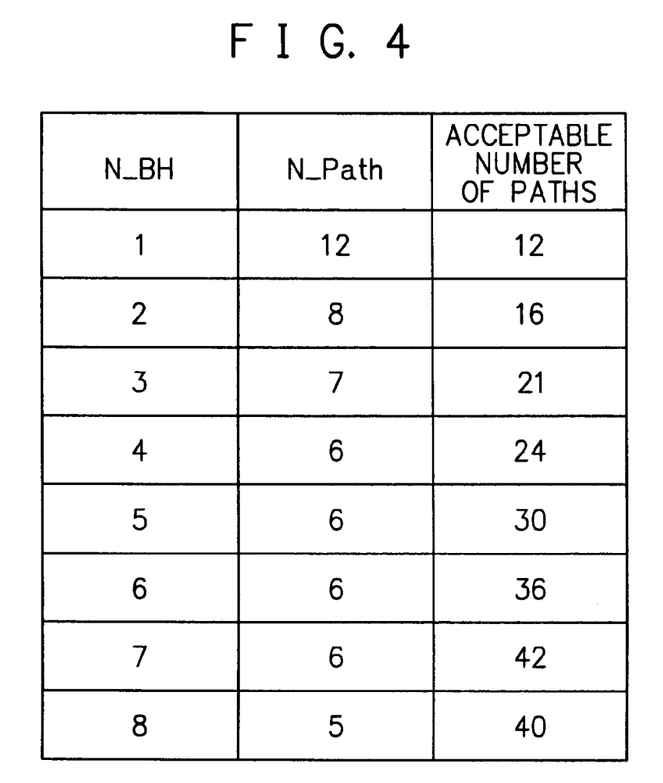
FIG. 4 is a table showing relationships among the number of received branches, the number of paths and the acceptable number of paths determined according to the embodiment of the present invention.

FIG. 4 shows the values of N_Path when N_Finger=8 and N_BH=1 to 8.

As just described, the path search processing time on the occasion when the number of branches has increased can be shortened by reducing the number of search paths according to the number of received branches. Incidentally, the number of candidate paths for path switching, 4, is cited merely by way of example and without limitation.

Figure 5:
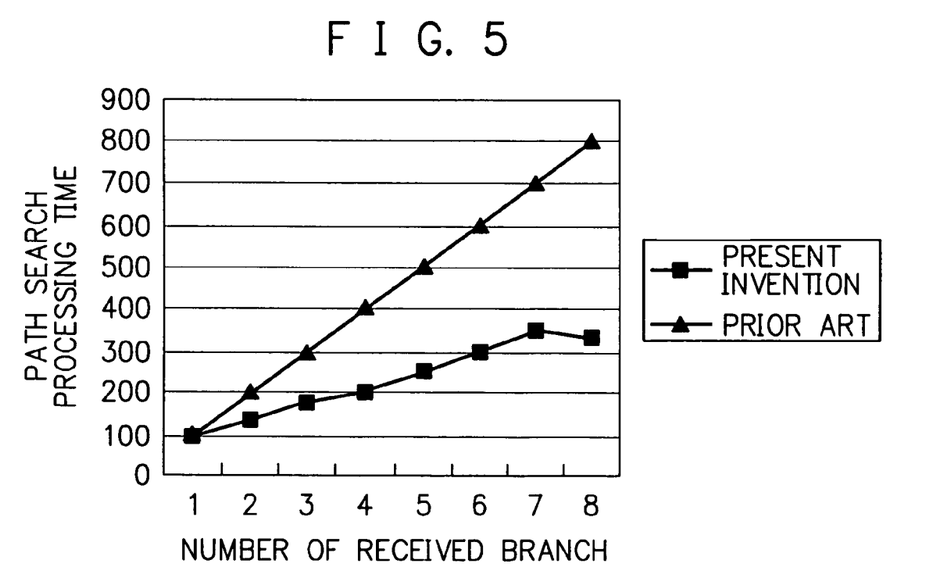
FIG. 5 is a chart showing the path search processing time corresponding to the number of received branches in the CDMA receiver of the present invention and that of the prior art.

FIG. 5 is a graph showing the difference between the path search processing time of the present invention and that of the prior art (the number of search paths is fixed regardless of the number of branches). In FIG. 5, when the number of branches=1, the processing time=100. As can be seen in FIG. 5, according to the present invention, the time taken to complete the path search processing is reduced as compared to the prior art. Consequently, electric power consumption by the receiver can be reduced. Moreover, the time from the preparation of the delay profile to the allocation of fingers is shortened. Therefore, path search characteristics are improved.

In the following, a description will be made of the second embodiment of the present invention with reference to FIG. 6.

Figure 6:
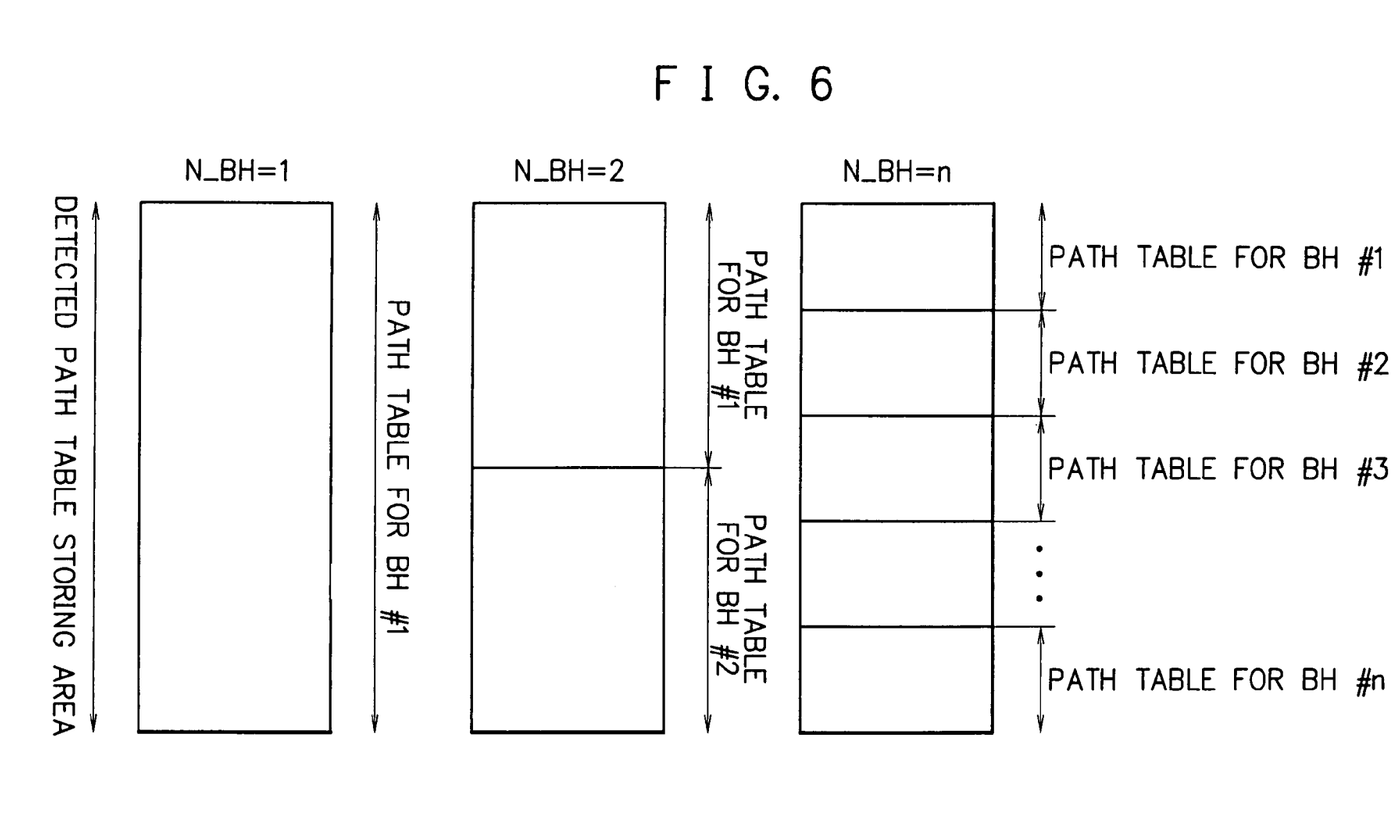
FIG. 6 is a diagram illustrating a method for reserving the detected path table storing area.

FIG. 6 is a diagram illustrating the method for reserving the area of the detected path table storing area. The CDMA receiver of this embodiment has essentially the same construction as described previously for that of the first embodiment except for the improved method of reserving area for storing the detected path tables. As can be seen in FIG. 1, the memory 2 includes the detected path table storing area 21 for storing the detected path table with respect to each branch. In this embodiment, the entire detected path storing area is reserved on the basis of the maximum number of stored paths derived from the relationship between the number of branches and the number of search paths described hereinbefore for the first embodiment, and the memory address of the path table area of each branch is changed according to the number of branches.

For example, in the prior art, when the number of search paths for each branch is 12 and the maximum number of received branches is 8, the detected path table storing area 21 needs memory area for 12×8=96 paths on the whole. On the other hand, according to this embodiment, when the number of paths is determined in the manner as previously set forth, the number of the entire paths is the maximum at the time the number of branches is 7. That is, the maximum number of stored paths is, at the maximum, 42 (6×7=42 paths). Thereby, it is only required to reserve memory area for 42 paths. Preferably, according to the present invention, the maximum number of stored paths is obtained from the relation between the number of received branches and the number of paths. In other words, the maximum number of stored paths is obtained by finding out the maximum value of the products of the respective numbers of received branches and the respective numbers of paths.

Thus, it is possible to reduce the memory area or memory capacity necessary for the receiver, which enables the miniaturization of the receiver and reductions in electric power consumption.

As set forth hereinabove, in accordance with the present invention, the processing time for a path search on the occasion when the number of branches has increased can be shortened by changing the number of paths to be searched for or to be detected according to the number of received branches. For example, the number of paths to be searched for or to be detected may be changed by setting a threshold value of the received signal level in advance, and determining the number of paths to be searched for or to be detected based on the number of paths when the received signal level exceeds the threshold value as a result of rake synthesis. Consequently, the CDMA receiver consumes lower amounts of power.

Besides, in the detected path table storing area, memory area and the address of memory area for storing detected path information corresponding to each branch are changed according to the number of branches. Thereby, it is possible to reduce memory capacity, which enables the miniaturization of the receiver and reductions in electric power consumption.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A CDMA receiver, comprising:
    a path search section for receiving signals from a plurality of base stations, and specifying finger allocation according to delay profiles of respective branch signals received from the plural base stations;
    a plurality of fingers which are allocated to the branch signals based on the finger allocation specified by the path search section; and
    a rake receiving section for maximal-ratio-combining the power of a plurality of signals obtained from the fingers, which have been distributed due to their respective delays;
    wherein the path search section includes a path management section to search for paths in response to the branch signals, and stores detected path information in a detected path table storing area in a memory; and
    wherein the number of paths which the path management section searches for is changed according to the number of received branch signals,
    wherein the number of paths which the path management section searches for with respect to each branch signal is found out by adding the number of candidate paths for path switching to a value obtained by dividing the number of the fingers by the number of the received branch signals.

2. A CDMA receiver, comprising:
a path search section for receiving signals from a plurality of base stations, and specifying finger allocation according to delay profiles of respective branch signals received from the plural base stations;
a plurality of fingers which are allocated to the branch signals based on the finger allocation specified by the path search section; and
a rake receiving section for maximal-ratio-combining the power of a plurality of signals obtained from the fingers, which have been distributed due to their respective delays;
wherein the path search section includes a path management section to search for paths in response to the branch signals, and stores detected path information in a detected path table storing area in a memory; and
wherein the number of paths which the path management section searches for is changed according to the number of received branch signals,
wherein, in the detected path table storing area, memory area and the address of memory area for storing detected path information with respect to each branch signal are changed according to the number of branch signals, and
wherein the number of paths which the path management section searches for with respect to each branch signal is found out by adding the number of candidate paths for path switching to a value obtained by dividing the number of the fingers by the number of the received branch signals.

3. A path management method with the use of a CDMA receiver, comprising:
a path search section for receiving signals from a plurality of base stations, and specifying finger allocation according to delay profiles of respective branch signals received from the plural base stations;
a plurality of fingers which are allocated to the branch signals based on the finger allocation specified by the path search section; and
a rake receiving section for maximal-ratio-combining the power of a plurality of signals obtained from the fingers, which have been distributed due to their respective delays;
wherein the operation of the path search section involves:
a path management step for searching for paths in response to the branch signals;
a path information storing step for storing detected path information in a detected path table storing area; and
a path number finding step for finding the number of paths to be searched at the path management step according to the number of received branch signals,
wherein, at the path number finding step, the number of paths to be searched with respect to each branch signal is determined on the basis of the maximum value of the products of the respective numbers of received branches and the respective numbers of paths.

4. A path management method with the use of a CDMA receiver, comprising:
a path search section for receiving signals from a plurality of base stations, and specifying finger allocation according to delay profiles of respective branch signals received from the plural base stations;
a plurality of fingers which are allocated to the branch signals based on the finger allocation specified by the path search section; and
a rake receiving section for maximal-ratio-combining the power of a plurality of signals obtained from the fingers, which have been distributed due to their respective delays;
wherein the operation of the path search section involves:
a path management step for searching for paths in response to the branch signals;
a path information storing step for storing detected path information in a detected path table storing area; and
a path number finding step for finding the number of paths to be searched at the path management step according to the number of received branch signals,
wherein, at the path information storing step, in the detected path table storing area, memory area and the address of memory area for storing detected path information with respect to each branch signal are changed according to the number of branch signals, and
wherein, at the path number finding step, the number of paths to be searched with respect to each branch signal is determined on the basis of the maximum value of the products of the respective numbers of received branches and the respective numbers of paths.

5. A computer readable medium storing a path management program for execution on a processor-controlled CDMA receiver, comprising:
a path search section for receiving signals from a plurality of base stations, and specifying finger allocation according to delay profiles of respective branch signals received from the plural base stations;
a plurality of fingers which are allocated to the branch signals based on the finger allocation specified by the path search section; and
a rake receiving section for maximal-ratio-combining the power of a plurality of signals obtained from the fingers, which have been distributed due to their respective delays;
wherein the CDMA receiver is controlled by the stored program such that the path search section implements;
a path management process for searching for paths in response to the branch signals;
a path information storing process for storing detected path information in a detected path table storing area; and
a path number finding process for finding the number of paths to be searched by the path management process according to the number of received branch signals,
wherein, in the path number finding process, the number of paths to be searched with respect to each branch signal is determined on the basis of the maximum value of the products of the respective numbers of received branches and the respective numbers of paths.

6. A computer readable medium storing a path management program for execution on a processor-controlled CDMA receiver, comprising:
a path search section for receiving signals from a plurality of base stations, and specifying finger allocation according to delay profiles of respective branch signals received from the plural base stations;
a plurality of fingers which are allocated to the branch signals based on the finger allocation specified by the path search section; and
a rake receiving section for maximal-ratio-combining the power of a plurality of signals obtained from the fingers, which have been distributed due to their respective delays;
wherein the CDMA receiver is controlled by the stored program such that the path search section implements:

a path management process for searching for paths in response to the branch signals;

a path information storing process for storing detected path information in a detected path table storing area; and a path number finding process for finding the number of paths to be searched by the path management process according to the number of received branch signals, wherein, in the path information storing process, in the detected path table storing area, memory area and the address of memory area for storing detected path information with respect to each branch signal are changed according to the number of branch signals, and wherein, in the path number finding process, the number of paths to be searched with respect to each branch signal is determined on the basis of the maximum value of the products of the respective numbers of received branches and the respective numbers of paths.

* * * * *